(12) United States Patent
Kersting

(10) Patent No.: US 10,949,478 B2
(45) Date of Patent: Mar. 16, 2021

(54) PLATFORM APPARATUS FOR ACTIVELY DISTRIBUTED QUALITATIVE COLLECTIVE KNOWLEDGE

(71) Applicant: Patrick Faulwetter, Marina Del Rey, CA (US)

(72) Inventor: Björn Kersting, Braunfels (DE)

(*) Notice: Subject to any disclaimer, the term of this patent is extended or adjusted under 35 U.S.C. 154(b) by 884 days.

(21) Appl. No.: 15/100,434

(22) PCT Filed: Jun. 27, 2014

(86) PCT No.: PCT/DE2014/100214
§ 371 (c)(1),
(2) Date: Nov. 7, 2016

(87) PCT Pub. No.: WO2015/078438
PCT Pub. Date: Jun. 4, 2015

(65) Prior Publication Data
US 2017/0169117 A1    Jun. 15, 2017

(30) Foreign Application Priority Data

Nov. 28, 2013 (WO) ............... PCT/DE2013/100400

(51) Int. Cl.
*G06F 16/90* (2019.01)
*G06F 16/9535* (2019.01)
(Continued)

(52) U.S. Cl.
CPC ........ *G06F 16/9535* (2019.01); *G06F 16/278* (2019.01); *G06F 16/953* (2019.01);
(Continued)

(58) Field of Classification Search
None
See application file for complete search history.

(56) References Cited

U.S. PATENT DOCUMENTS

| 6,260,064 B1 | 7/2001 | Kurzrok |
| 7,031,952 B1 | 4/2006 | Heumann |

(Continued)

FOREIGN PATENT DOCUMENTS

| FR | 2981766 A1 | 4/2013 |
| JP | 5691229 B2 | 4/2015 |

(Continued)

OTHER PUBLICATIONS

Basic Support for Cooperative Work, Version 4.4, Oct. 2007, OrbiTeam Software GmbH & Co. KG, Bonn, Germany.

(Continued)

*Primary Examiner* — Jau Shya Meng
(74) *Attorney, Agent, or Firm* — Bachman & LaPointe, P.C.

(57) ABSTRACT

For a platform device placed on a web-site and capable of forming a network with code-identifiable users or participants for the purpose of gathering and processing, by the users or participants, of items of information each stored in storage spaces of a platform which storage spaces are identifiable per predefined coding and are assigned to (associated with) a plurality of predefined different topics, an actively automated distribution of information collected by the users or participants is achieved in that the storage spaces (110) are each formed by a dual unit DuU on the platform, a dual unit DuU comprising a first storage space assigned to a predefined topic and provided with initial information formulated by an initial participant but not editable by any other individual user or participant and also a second storage space assigned to the first storage space which is editable by any one individual user or participant and is construed for insertion, by the plurality of users or participants, of additional items of information relevant to the initial information stored in the first storage space.

13 Claims, 1 Drawing Sheet

(51) Int. Cl.

| | |
|---|---|
| *G06F 16/953* | (2019.01) |
| *G06F 16/958* | (2019.01) |
| *G06Q 30/02* | (2012.01) |
| *G06Q 30/06* | (2012.01) |
| *G06Q 10/10* | (2012.01) |
| *G06F 16/27* | (2019.01) |
| *H04L 29/08* | (2006.01) |

(52) U.S. Cl.
CPC ......... *G06F 16/958* (2019.01); *G06Q 10/103* (2013.01); *G06Q 30/0239* (2013.01); *G06Q 30/0282* (2013.01); *G06Q 30/0621* (2013.01); *H04L 67/10* (2013.01)

(56) References Cited

U.S. PATENT DOCUMENTS

| | | | |
|---|---|---|---|
| 7,447,807 B1 | 11/2008 | Merry | |
| 7,962,482 B2 | 6/2011 | Handman et al. | |
| 8,127,095 B1 | 2/2012 | Colgrove | |
| 8,612,449 B1 | 12/2013 | Cuthbert | |
| 8,645,295 B1 | 2/2014 | Dillard | |
| 9,613,321 B2 | 4/2017 | Molyneux | |
| 9,984,079 B1 | 5/2018 | Stickle | |
| 2002/0049738 A1 | 4/2002 | Epstein | |
| 2002/0199186 A1 | 12/2002 | Ali | |
| 2003/0093423 A1 | 5/2003 | Larason | |
| 2004/0266743 A1 | 12/2004 | McMahon | |
| 2005/0097188 A1 | 5/2005 | Fish | |
| 2005/0223002 A1 | 10/2005 | Agarwal | |
| 2006/0064411 A1 | 3/2006 | Gross et al. | |
| 2006/0247944 A1* | 11/2006 | Calusinski, Jr. ....... | G06Q 40/00 705/1.1 |
| 2006/0282304 A1 | 12/2006 | Bedard | |
| 2007/0061211 A1 | 3/2007 | Ramer | |
| 2008/0114629 A1 | 5/2008 | Pavlov | |
| 2008/0201418 A1 | 8/2008 | Krishnan | |
| 2009/0259526 A1 | 10/2009 | Bechtel | |
| 2009/0327186 A1 | 12/2009 | Vivalda et al. | |
| 2010/0005093 A1 | 1/2010 | Heumann et al. | |
| 2010/0023382 A1* | 1/2010 | Fushimi ................. | G06Q 30/02 705/7.29 |
| 2010/0049683 A1 | 2/2010 | Carter | |
| 2010/0115215 A1 | 5/2010 | Rosychuk | |
| 2010/0205006 A1 | 8/2010 | Bergh | |
| 2010/0205543 A1 | 8/2010 | Von Werther | |
| 2010/0306223 A1 | 12/2010 | Lee | |
| 2011/0016179 A1 | 1/2011 | Bechtel | |
| 2011/0055017 A1* | 3/2011 | Solomon ................ | G06Q 30/02 705/14.66 |
| 2011/0106757 A1* | 5/2011 | Pickney ............... | G06F 11/2094 707/617 |
| 2011/0178981 A1 | 7/2011 | Bowen | |
| 2011/0231350 A1* | 9/2011 | Momma .............. | G06K 9/6218 706/12 |
| 2012/0110429 A1 | 5/2012 | Tzonis et al. | |
| 2013/0159289 A1 | 6/2013 | Matthews | |
| 2013/0246643 A1* | 9/2013 | Luby ................ | H04N 21/23439 709/231 |
| 2013/0339301 A1 | 12/2013 | Saito | |
| 2014/0181210 A1 | 6/2014 | Kersting | |
| 2014/0310285 A1 | 10/2014 | Chan | |
| 2014/0330831 A1 | 11/2014 | Kersting | |
| 2014/0365457 A1 | 12/2014 | Kersting et al. | |
| 2014/0372432 A1 | 12/2014 | Kersting | |
| 2015/0347480 A1 | 12/2015 | Smart | |
| 2017/0017885 A1 | 1/2017 | Kersting | |

FOREIGN PATENT DOCUMENTS

| | | |
|---|---|---|
| WO | 2013/029602 A1 | 3/2013 |
| WO | 2013/029605 A1 | 3/2013 |

OTHER PUBLICATIONS

International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.
BSCW 4.4 Manual, Nov. 2008, OrbiTeam Software GmbH & Co. KG, Bonn, Germany.
U.S. Office Action dated Jun. 26, 2019 for U.S. Appl. No. 15/100,455.
U.S. Office Action dated Oct. 9, 2019 for U.S. Appl. No. 15/100,443.
U.S. Office Action dated Apr. 1, 2019 for U.S. Appl. No. 15/100,443.
U.S. Office Action dated Sep. 7, 2018 for U.S. Appl. No. 15/100,443.
U.S. Office Action dated Nov. 26, 2018 for U.S. Appl. No. 15/100,440.
Antunes Pedro, "Reviewing the Quality of Awareness Support in Collaborative Applications", Journal of Systems and Software, 2014 (available online Nov. 15, 2013), pp. 146-169, Elsevier, Amsterdam, Netherlands.
BSCW 4.5 Manual, Jun. 2011, OrbiTeam Software GmbH & Co. KG, Bonn, Germany.
U.S. Office Action dated Feb. 26, 2019 for U.S. Appl. No. 15/100,431.
U.S. Office Action dated Aug. 21, 2019 for U.S. Appl. No. 15/100,431.
U.S. Office Action dated Mar. 20, 2020 for U.S. Appl. No. 15/100,431.
Office Action dated Aug. 18, 2020 for U.S. Appl. No. 15/100,443.

* cited by examiner

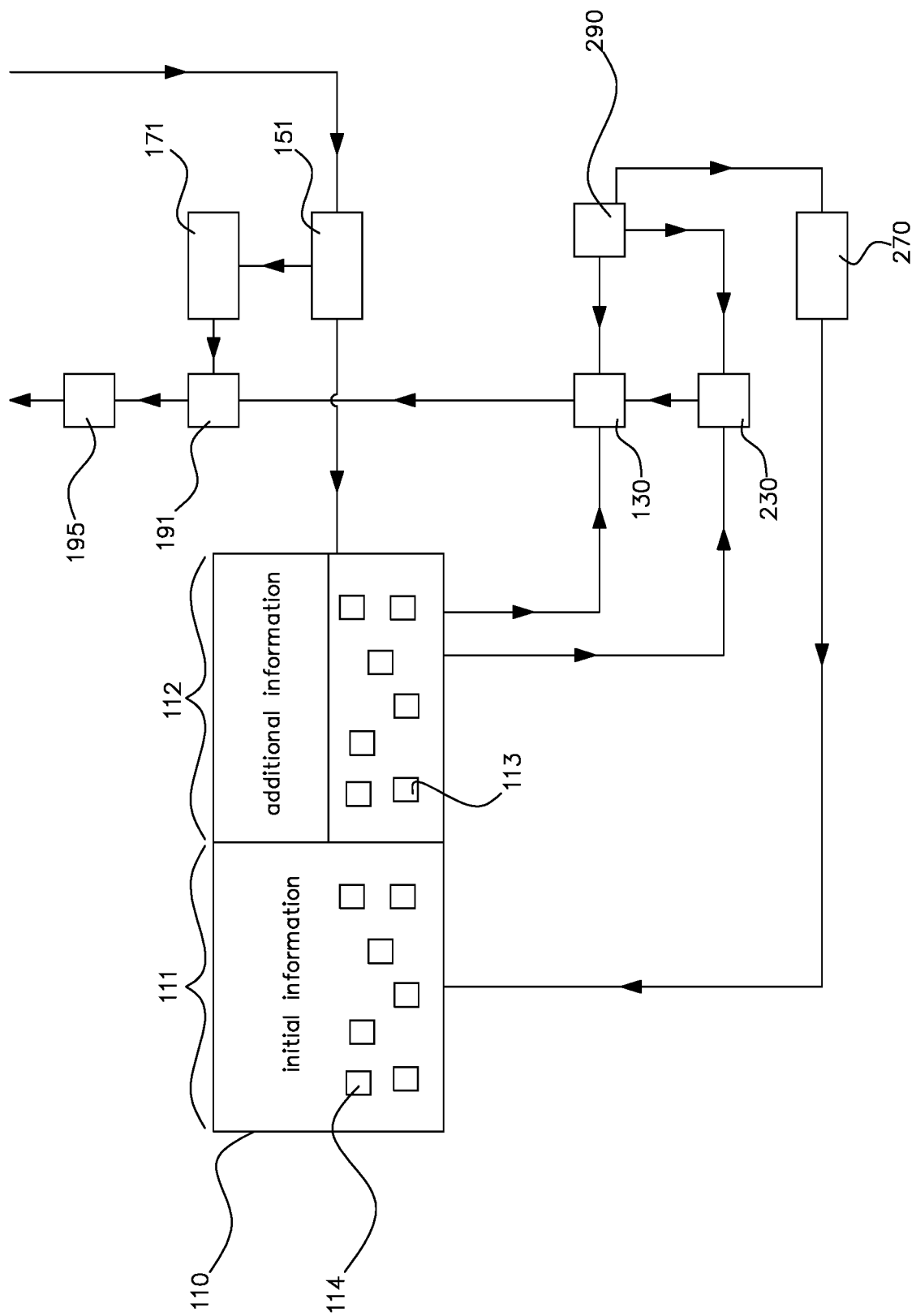

PLATFORM APPARATUS FOR ACTIVELY DISTRIBUTED QUALITATIVE COLLECTIVE KNOWLEDGE

BACKGROUND

The present invention relates to a platform device placed on a web-site and capable of forming a network with a plurality of ID-detectable users or participants for gathering and processing, on the part of the users or participants, of items of information stored in each case in predefined code-identifiable memory spaces of a platform and assigned to a plurality of different topics.

Platform devices of the type mentioned above are known in the prior art for a number of applications. They are operated, inter alia, in the world-wide internet. The prior platform devices suffer from the disadvantage that it is not possible to select predefinable links and at the same time links according to predefinable criteria. One reason for this may be regarded as being the fact that the current platforms store items of information, without these items of information being attributed to strictly predefinable processing criteria and to strictly predefinable evaluation criteria.

Moreover, the prior platform devices are not efficient in the distribution of collective knowledge.

SUMMARY

Thus it is an object of the present invention to create a platform device, by means of which items of information stored in a first memory are available to the network participants according to strictly predefined processing criteria and are capable of being provided with additional items or are otherwise changeable and by means of which an effective automated distribution of, in particular, an item of qualitative information representing collective knowledge is enabled.

With regard to a platform device of the type mentioned above this object is achieved in that the storage spaces on the platform are formed in each case by a dual unit DuU, a dual unit DuU comprising in each case a first storage space assigned to a predefined topic and provided with initial information formulated by an initial participant but not editable by any other individual user or participant and a second storage space assigned to the first storage space which is editable by any one individual user or participant and is construed for the insertion, by the plurality of users or participants, of additional items of information relevant to the initial information stored in the first storage space, wherein an identifying device is provided, in order to identify all users or participants that contribute an additional item of information to a prescribed storage space with respect to the identifier thereof and to store the same in a user-participant register, so as, on insertion of an in each case new additional item of information in the second storage space by any one of the identified users or participants, to undertake an automated transmission (DuU-feed) containing the new additional item of information from at least a portion of the associated dual unit to at least some of the other registered users or participants stored in the user-participant register by means of a suitable transmitting unit provided for this purpose.

Preferred embodiments of the invention are subject matter of the subclaims.

Regarding the platform device of the invention, as a result of the combination of features to the effect that the storage spaces on the platform are formed in each case by a dual unit DuU, a dual unit DuU comprising in each case a first storage space assigned to a predefined topic and provided with initial information formulated by an initial participant but not editable by any other individual user or participant and a second storage space assigned to the first storage space which is editable by any one individual user or participant and is construed for the insertion of additional items of information relevant to the initial information stored in the first storage space, an identifying device being provided for the purpose of identifying all users or participants that contribute an additional item of information to a prescribed storage space with respect to the identifier thereof and storing the same in a user-participant register, so as, on insertion of an in each case new additional item of information in the second storage space by any one of the identified users or participants, to carry out, by means of a transmitting unit, an automated transmission (DuU-feed) containing the new additional item of information from at least a portion of the associated dual unit to at least some of the other registered users or participants stored in the user-participant register, with the result that due to the formation of dual units, items of information, particularly those providing qualitative information, can be processed and modified with respect to very specific processing stipulations, and can then be stored such that the individual items of information inserted in the form of supplements and individual commentaries and individual evaluations provide a form of collective knowledge that is transferable according to strictly defined criteria per actively automated transmission (DuU-feed) to a predeterminable number of users or participants.

The aim and purpose of a processing operation that can be provided by the plurality of the users or participants is in this case mainly to make an initial item of information, read into a first storage space of a dual unit by an initial author, capable of being accessed and edited on the part of the users or participants, in order to provide the initial information with a reliability grading or, respectively, with a reliability value which is introduced on the part of the users or participants into the first storage space on conclusion of a processing operation carried out according to the invention and representing for all participants a clearly defined swarm value.

According to a first preferred embodiment of the device of the invention provision is made such that an additional item of information is formed by the plurality of users or participants by means of a qualitative evaluation of the items of information stored in the first space.

To this end there is preferably provided at least one calculating device, in order to produce a general item of evaluation information on account of the qualitative evaluations imported by the users or participants.

Furthermore, provision can be made to the effect that a transmission (DuU-feed) containing the new additional item of information is sent to all other registered users or participants stored in the user-participant register.

Alternatively, the identification codes of the identified users or participants can be suitably adapted so as to form predetermined sub-groups of users or participants, in order to create the user-participant filters using identification codes, so as to transmit only specified transmissions (DuU-feeds) to users or participants of one or more predefined sub-groups.

Criteria for all participants of sub-groups of users or participants include features such as age, sex, locality, accumulation of predefined web activities, inclinations and proven interests etc. of the individual users or participants.

A transmission (DuU-feed) to the identifier of an identified user or participant preferably takes place by way of a transmitting unit, activated by the insertion of the relevant further additional item of information for the creation of an information link to other registered users or participants stored in the user-participant register.

According to an important preferred embodiment of the device of the invention provision is made such that in the editable second storage space additional items of information are readable on the part of the users or participants in the form of qualitative evaluations of the items of information stored in the first space and calculated by means of at least the calculating device and storable in each case in an associated memory, the at least one calculating device being construed so as to produce a general item of evaluation information on account of imported qualitative evaluations.

The at least one calculating device is preferably construed so as to carry out a qualitative evaluation by inputting individually assignable marks of a scale of marks having a predefined number of marks, as is enabled for each user or participant, wherein in the case of each input the given marks are storable in an associated marks storage device. A scale of marks may be conceived, for example, such that it is possible for each of the users or participants to allocate marks ranging from zero to 10 or from zero to 100, according to the degree of evaluation accuracy required.

Preferably, a first calculating device is provided, which calculates an average value of the marks cumulatively imported in the second storage space and awarded in each case by different users or participants and stores the relevant number in the second storage space, an average mark value being calculated by adding all marks ranging from zero to a maximum number of marks of the scale of marks which users or participants have allocated during the course of each evaluation, and dividing the total by the number of users or participants that have awarded marks during said evaluation.

Moreover, there is preferably provided a second calculating device, which carries out a variance calculation relevant to the marks cumulatively imported in the second storage space and awarded in each case by different users or participants and stores the relevant number in the second storage space, the variance being defined as the mean mark differential relative to the average mark value ascertained by the first calculating device.

A transmission (DuU-feed) containing the new additional item of information can in this case only comprise the contents of the first storage space or, depending on the presetting, alternatively comprise the contents of a first storage space and also the contents of the second storage space assigned to the first storage space.

Furthermore, provision can be made to the effect that a transmission (DuU-feed) containing the new additional item of information is carried out to all other registered users or participants stored in the user-participant register. Alternatively, the identification codes of the identified users or participants can be suitably adapted so as to form predetermined sub-groups of users or participants, in order to create the user-participant filters using identification codes, so as to transmit only specified transmissions (DuU-feeds) to users or participants of one or more predefined sub-groups.

Criteria for all participants of sub-groups of users or participants include features such as age, sex, locality, accumulation of predefined web activities, inclinations and proven interests etc. of the individual users or participants.

A transmission (DuU-feed) to the identifier of an identified user or participant preferably takes place by way of a transmitting unit, as activated by the insertion of the relevant further additional item of information for the creation of an information link to other registered users or participants stored in the user-participant register.

According to a further preferred embodiment of the device of the invention, there is provided a first copying device which, on elapse of settable time intervals, successively interprets the qualitative evaluations stored in the second space as being useful items of information and transfers them to the first storage space while overwriting the relevant previous items of information in the first storage space.

In addition, there is preferably provided a timing device which transmits reset signals in predefined constant periods of time to the first and second calculating devices and also to the first copying device, in order to set the associated devices to zero on conclusion of a respective presettable time interval and to repeat the currently assigned function in an immediately following time-period of equal length.

The device of the invention can then be used in a particularly versatile manner, when an initial placement of a dual unit having a first and second storage space has been granted to any one of the participants.

BRIEF DESCRIPTION OF THE DRAWING

The device of the invention is explained below with reference to a preferred embodiment which is illustrated in the FIGURE of the drawing and in which:

FIG. 1 shows a theoretical embodiment of a dual unit DuU corresponding to a preferred embodiment of the invention in the form of a block diagram.

DETAILED DESCRIPTION

The platform device 100 of the invention placed on a web-site is capable of forming a network with a plurality of ID-detectable users or participants and construed for gathering and processing, on the part of the users or participants, of items of information stored in a plurality of in each case code-identifiable and in each case theme-dependent memory spaces 110 of a platform.

The storage spaces 110 subdivided into a number of different topics are formed on the platform 100 in each case by a dual unit DuU, a dual unit DuU in each case comprising a first storage space 111 assigned to a predefined topic and provided with initial information 114 formulated by an initial participant but not editable by any other individual user or participant and also a second storage space 112 assigned to the first storage space 111 which is editable by any one individual user or participant and is construed for the insertion, by the plurality of users or participants, of additional items of information 113 relevant to the initial information 114 stored in the first space 111.

In this case an identifying device 151 is provided for the purpose of identifying all users or participants that contribute an additional item of information 113 to a prescribed storage space with respect to the identifier thereof and for storing the same in a user-participant register 171, in order to undertake, on insertion of an in each case new additional item of information 113 in the second storage space 112 by any one of the identified users or participants, an automated transmission (DuU-feed) containing the new additional item of information 113 of at least a portion of the associated dual unit to at least some of the other registered users or participants stored in the user-participant register 171 by means of a transmitting unit 195 provided for this purpose.

An additional item of information is formed in this case, by the plurality of users or participants, by way of a qualitative evaluation of the items of information stored in the first space 111. To this end there is provided at least one calculating device 130 for the purpose of producing a general item of evaluation information on account of the qualitative evaluations imported by the users or participants.

A transmission (DuU-feed) containing an in each case new additional item of information 113 comprises the contents of a first storage space 111 and also the contents of the second storage space 112 assigned to the first storage space 111 dummy The identification codes of the identified users or participants are construed so as to form predetermined sub-groups of users or participants, in order to create the user-participant filters using identification codes, so as to transmit only specified transmissions (DuU-feeds) to users or participants of one or more predefined sub-groups.

Criteria for all participants of sub-groups of users or participants include age, sex, locality, accumulation of predefined web activities etc. of the individual users or participants referred to.

A transmission (DuU-feed) to the identifier of an identified user or participant takes place by means of a transmitting unit 195, as activated by the insertion of the relevant further additional item of information 113 for the creation of an information link to other registered users or participants stored in the user-participant register.

In the editable second storage space 112, additional items of information can be imported by the users or participants and are storable in the form of qualitative evaluations of the items of information stored in the first space 111, calculated by means of at least one calculating device 130, the at least one calculating device 130 being construed so as to produce a general item of evaluation information on account of imported qualitative evaluations.

The at least one calculating device 130 is construed so as to make it possible for any one of the users or participants to effect a qualitative evaluation by means of the insertion, enabled for each user or participant, of individually assignable marks of a scale of marks, by means of which an allocation of marks ranging from zero to 100 is enabled.

A first calculating device 130 is provided, which calculates an average value of the marks cumulatively imported to the second storage space 112 and awarded in each case by different users or participants and stores the relevant number in the second storage space 112, an average mark value being calculated by adding up all marks ranging from zero to a maximum number of marks of the scale of marks which users or participants have allocated during the course of a respective evaluation, and dividing the sum by the number of users or participants that have awarded such an evaluation.

A second calculating device 230 is provided, which carries out a variance calculation relevant to the marks cumulatively imported to the second storage space 112 and awarded in each case by different users or participants and stores the relevant number in the second storage space 112, the variance being defined as the mean mark differential relative to the average mark value calculated by the first calculating device 130.

Furthermore, there is provided a first copying device 270 which, on elapse of settable time intervals, successively interprets the qualitative evaluations stored in the second space 112 as being useful items of information and transfers them to the first storage space 111 while overwriting the relevant previous items of information in the first storage space 111.

A timing device 290 is provided which transmits reset signals in predefined constant periods of time to the first calculating device 130 and to the second calculating device 230 and also to the first copying device 270, in order to set the associated devices to zero on conclusion of a respective presettable time interval and to repeat the currently assigned function in an immediately following time-period of equal length.

Each of the users or participants is entitled to an initial placement of a dual unit having a first storage space 111 and a second storage space 112, as initial user or participant.

The above described exemplary embodiment of the invention merely serves the purpose of providing a better understanding of the teaching of the invention prescribed by the claims and is not, as such, restricted to said exemplary embodiment.

What is claimed is:

1. One or more servers having a processor and memory and hosting a website and having a platform device placed on a web-site the website and forming a network with code-identifiable users or participants for the gathering and processing, by the users or participants, of items of information each stored in storage spaces wherein said storage spaces are identifiable per predefined coding and are associated with a plurality of predefined different topics, wherein:

the storage spaces are each formed by a dual unit DuU;

each dual unit DuU comprises a first storage space associated with a predefined topic and provided with initial information formulated by an initial participant but not editable by any other individual useror participant and also a second storage space associated with the first storage space and editable by any one individual user or participant to receive additional items of information relevant to the initial information stored in the first storage space;

an identifying device identifies all users or participants who contribute a respective said additional item of information to a prescribed said second storage space by a code identifier of said prescribed second storage space and for storing the code identifier in a user-participant register;

a transmitting unit transmitting, upon insertion of the respective new said additional item of information into the second storage space by any one of the users or participants, an automated transmission (DuU-feed), said automated transmission containing the new said additional item of information, to at least some of the registered users or participants, other than the users or participants, stored in the user-participant register;

each said additional item of information is formed by the plurality of users or participants by way of a qualitative evaluation of the items of information stored in the first storage space and a transmission (DuU-feed) each containing the new said additional item of information comprises the contents of a first storage space and also comprises the contents of the second storage space associated with the first storage space;

the identification codes of the users or participants, in order to form predetermined sub-groups of users or participants, create the user-participant filters using identification codes, to transmit only specified transmissions (DuU-feeds) to users or participants of one or more predefined sub-groups;

in the editable second storage space said additional items of information in the form of qualitative evaluations of the items of information stored in the first space calculated by means of at least one calculating device are readable by the users or participants and each storable in an associated memory, the at least one calculating device being configured to produce a general item of evaluation information based on imported qualitative evaluations;

the at least one calculating device is configured to carry out a qualitative evaluation by inputting individually assignable marks (grades) of a scale of marks having a predefined number of marks on the scale, for each of the users or participants, wherein in the case of each input assigned said assignable marks are storable in an associated marks storage device;

the at least one calculating device includes a first calculating device wherein said first calculating device calculates an average value of the marks cumulatively imported to the marks storage device, said marks awarded by multiple said users or participants, and stores the average mark value in the second storage space, an average mark value being calculated by adding up to form a sum all marks ranging from zero to a maxi mum number of marks of the scale of marks as allocated by users or participants in said awarding a respective evaluation, and dividing the sum by the number of users or participants that have awarded such an evaluation;

a second calculating device is provided, wherein said second calculating device carries out a variance calculation of the marks cumulatively imported to the second storage space and stores the variance in the second storage space, the variance calculated by said variance calculation being defined as a mean mark differential relative to the average mark value calculated by the first calculating device;

a copying device is provided wherein said copying device successively interprets as being useful items of information the qualitative evaluations stored in the second space on conclusion of settable time intervals and transfers the qualitative evaluations to the first storage space and overwrites the previous items of information in the first storage space;

a timing device is provided wherein said timing device transmits reset signals in predefined constant periods of time to the first and second calculating devices, and also to the first copying device, in order to set respective values in the first and second calculating devices and the first copying device to zero on conclusion of a respective presettable time interval and to repeat respective assigned functions of the first and second calculating devices and the first copying device in an immediately following time-period of equal length.

2. The one or more servers hosting a website as claimed in claim 1 wherein: at least one calculating device produces a general item of evaluation information on account of the qualitative evaluations provided by the users or participants.

3. The one or more servers hosting a website as claimed in claim 1 wherein: a transmission (DuU-feed) each containing a new said additional item of information is transmitted to all other registered users or participants stored in the user-participant register.

4. The one or more servers hosting a website as claimed in claim 1 wherein: criteria forming the sub-groups of users or participants include age, sex, locality, and accumulation of predefined web activities of the individual users or participants.

5. The one or more servers hosting a website as claimed in claim 1, wherein: a transmission (DuU-feed) to the code identifier of a said user or participant takes place by means of the transmitting unit, as activated by insertion of further said additional item of information to create an information link to other registered users or participants stored in the user-participant register.

6. The one or more servers hosting a website as claimed in claim 1, wherein: the scale of marks is an allocation of marks ranging from zero to one hundred by each of the users or participants.

7. The one or more servers hosting a website as claimed in claim 1, wherein: any one of the participants is entitled to carry out an initial placement of a dual unit having a first storage space and a second storage space.

8. The one or more servers hosting a website as claimed in claim 1, wherein:
a transmission (DuU-feed) to the code identifier of an identified user or participant takes place by means of the transmitting unit, as activated by the insertion of the relevant further said additional item of information to create an information link to other registered users or participants stored in the user-participant register;
in the editable second storage space said additional items of information in the form of qualitative evaluations of the items of information stored in the first space calculated by means of at least one calculating device are readable by the users or participants and each storable in an associated memory, the at least one calculating device being configured to produce a general item of evaluation information based on imported qualitative evaluations; and
the at least one calculating device configured to carry out a qualitative evaluation by inputting individually assignable marks (grades) of a scale of marks having a predefined number of marks on the scale, for each of the users or participants, wherein in the case of each input assigned said assignable marks are storable in an associated marks storage device.

9. The one or more servers hosting a website as claimed in claim 8, wherein:
the at least one calculating device includes a first calculating device wherein said first calculating device calculates an average value of the marks cumulatively imported to the marks storage device, said marks awarded by multiple said users or participants, and stores the average mark value in the second storage space, an average mark value being calculated by adding up to form a sum all marks ranging from zero to a maximum number of marks of the scale of marks as allocated by users or participants in said awarding a respective evaluation, and dividing the sum by the number of users or participants that have awarded such an evaluation.

10. A method for hosting a web-site on one or more servers having one or more processors, and processing evaluation information, the method comprising:
forming a network with code-identifiable users or participants;
providing the users or participants, access to items of information stored in storage spaces of the one or more servers, wherein said storage spaces are identifiable per predefined coding and are associated with a plurality of predefined different topics, characterized in that the storage spaces are each formed by a dual unit DuU on the one or more servers, whereby each dual unit DuU comprises a first storage space associated with a predefined topic and provided with initial information formulated by an initial participant but not editable by any other individual user or participant and also a second storage space associated with the first storage space and editable by any one individual user or participant and is configured for insertion, by the plurality of users or participants, of additional items of information, namely evaluation information, relevant to the initial information stored in the first storage space, an identifying device identifying all users or participants who contribute a said additional item of information to a prescribed said second storage space with respect to a code identifier of said prescribed second storage space and storing the code identifier in a user-participant register; and upon insertion of a respective new said additional item of information into the second storage space by any one of the users or participants, transmitting by means of a transmitting unit, an automated transmission (DuU-feed), said automated transmission containing the new said additional item of information, to at least some of the registered users or participants, other than the inserting one of the users or participants, stored in the user-participant register, wherein:

a transmission (DuU-feed) to the code identifier of an identified user or participant takes place by means of the transmitting unit, as activated by the insertion of the relevant further said additional item of information to create an information link to other registered users or participants stored in the user-participant register;

in the editable second storage space said additional items of information in the form of qualitative evaluations of the items of information stored in the first space calculated by means of at least one calculating device are readable by the users or participants and each storable in an associated memory, the at least one calculating device being configured to produce a general item of evaluation information based on imported qualitative evaluations; and the at least one calculating device configured to carry out a qualitative evaluation by inputting individually assignable marks (grades) of a scale of marks having a predefined number of marks on the scale, for each of the users or participants, wherein in the case of each input assigned said assignable marks are storable in an associated marks storage device.

11. The method as claimed in claim 10, wherein:

the at least one calculating device includes a first calculating device wherein said first calculating device calculates an average value of the marks cumulatively imported to the marks storage device, said marks awarded by multiple said users or participants, and stores the average mark value in the second storage space, an average mark value being calculated by adding up to form a sum all marks ranging from zero to a maximum number of marks of the scale of marks as allocated by users or participants in said awarding a respective evaluation, and dividing the sum by the number of users or participants that have awarded such an evaluation.

12. One or more servers having a processor and memory and hosting a website and having a platform device placed on the website and forming a network with code-identifiable users or participants for the gathering and processing, by the users or participants, of items of information each stored in storage spaces wherein said storage spaces are identifiable per predefined coding and are associated with a plurality of predefined different topics, wherein:

the storage spaces are each formed by a dual unit DuU;

each dual unit DuU comprises a first storage space associated with a predefined topic and provided with initial information formulated by an initial participant but not editable by any other individual useror participant and also a second storage space associated with the first storage space and editable by any one individual user or participant to receive additional items of information relevant to the initial information stored in the first storage space;

an identifying device identifies all users or participants who contribute a said additional item of information to a prescribed said second storage space by a code identifierof said prescribed second storage space and for storing the code identifier in a user-participant register;

a transmitting unit transmitting, upon insertion of a respective new said additional item of information into the second storage space by any one of the identified users or participants, an automated transmission (DuU-feed), said automated transmission containing the new said additional item of information, to at least some of the registered users or participants, other than the identified users or participants, stored in the user-participant register;

a said additional item of information is formed by the plurality of users or participants by way of a qualitative evaluation of the items of information stored in the first storage space and a transmission (DuU-feed) each containing the new said additional item of information comprises the contents of a first storage space and also comprises the contents of the second storage space associated with the first storage space;

the identification codes of the identified users or participants, in order to form predetermined sub-groups of users or participants, create the user-participant filters using identification codes, to transmit only specified transmissions (DuU-feeds) to users or participants of one or more predefined sub-groups;

a transmission (DuU-feed) to the code identifier of an identified useror participant takes place by means of the transmitting unit, as activated by the insertion of the relevantfurther said additional item of information to create an information linkto other registered users or participants stored in the user-participant register;

in the editable second storage space said additional items of information in the form of qualitative evaluations of the items of information stored in the first space calculated by means of at least one calculating device are readable by the users or participants and each storable in an associated memory, the at least one calculating device being configured to produce a general item of evaluation information based on imported qualitative evaluations; and the at least one calculating device configured to carry out a qualitative evaluation by inputting individually assignable marks (grades) of a scale of marks having a predefined number of marks on the scale, for each of the users or participants, wherein in the case of each input the assigned marks are storable in an associated marks storage device.

13. The one or more servers as claimed in claim 12, wherein:

the at least one calculating device includes a first calculating device wherein said first calculating device calculates an average value of the marks cumulatively imported to the marks storage device, said marks awarded by multiple said users or participants, and stores the average mark value in the second storage space, an average mark value being calculated by adding up to form a sum all marks ranging from zero to a maximum number of marks of the scale of marks as allocated by users or participants in said awarding a respective evaluation, and dividing the sum by the number of users or participants that have awarded such an evaluation.

* * * * *